US012668142B2

(12) United States Patent
Ito

(10) Patent No.: US 12,668,142 B2
(45) Date of Patent: Jun. 30, 2026

(54) VEHICLE

(71) Applicant: TOYOTA JIDOSHA KABUSHIKI KAISHA, Toyota (JP)

(72) Inventor: Shinya Ito, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 222 days.

(21) Appl. No.: 18/777,783

(22) Filed: Jul. 19, 2024

(65) Prior Publication Data

US 2025/0128622 A1 Apr. 24, 2025

(30) Foreign Application Priority Data

Oct. 18, 2023 (JP) ................................. 2023-179705

(51) Int. Cl.
| | |
|---|---|
| B60L 53/30 | (2019.01) |
| B60L 3/00 | (2019.01) |
| B60T 13/12 | (2006.01) |

(52) U.S. Cl.
CPC ............. B60L 53/30 (2019.02); B60L 3/0007 (2013.01); B60T 13/12 (2013.01)

(58) Field of Classification Search
CPC ......... B60L 53/30; B60L 3/0007; B60T 13/12
See application file for complete search history.

(56) References Cited

U.S. PATENT DOCUMENTS

| | | | | |
|---|---|---|---|---|
| 7,802,643 | B2 * | 9/2010 | Yajima | B60K 6/22 |
| | | | | 180/274 |
| 8,893,843 | B2 * | 11/2014 | Hayano | B60L 15/007 |
| | | | | 180/68.5 |
| 9,101,060 | B2 * | 8/2015 | Yamanaka | B60K 1/00 |
| 2013/0037335 | A1 | 2/2013 | Sakamoto | |
| 2015/0021114 | A1 * | 1/2015 | Hotta | B60R 16/04 |
| | | | | 180/274 |

FOREIGN PATENT DOCUMENTS

| | | | | |
|---|---|---|---|---|
| CN | 103935405 A | * | 7/2014 | ........... B60L 3/0007 |
| JP | 2013-035445 A | | 2/2013 | |
| JP | 2021-041868 A | | 3/2021 | |
| JP | 2021-115892 A | | 8/2021 | |

* cited by examiner

*Primary Examiner* — Timothy Hannon
(74) *Attorney, Agent, or Firm* — SoraIP, Inc.

(57) ABSTRACT

The vehicle may include an electrical unit electrically connected to the battery, and a brake unit positioned rearward of the electrical unit in the vehicle front-rear direction. The electrical unit and the brake unit may be arranged in a front compartment. The brake unit may be disposed adjacent to the electrical unit at a position offset to one side in the vehicle left-right direction with respect to the electrical unit. One of the electrical unit and the brake unit may be provided with a protector that covers a region located adjacent to another. A portion of the protector that extends in the vehicle front-rear direction includes a tilted surface that gradually changes in position to the one side in the vehicle left-right direction toward a front of the vehicle.

5 Claims, 6 Drawing Sheets

VEHICLE

CROSS-REFERENCE TO RELATED APPLICATION

This application claims priority to Japanese Patent Application No. 2023-179705 filed on Oct. 18, 2023, incorporated herein by reference in its entirety.

BACKGROUND

1. Technical Field

The technique disclosed in the present specification relates to vehicles.

2. Description of Related Art

Japanese Unexamined Patent Application Publication No. 2021-41868 (JP 2021-41868 A) describes a vehicle. The vehicle includes a battery and a charger for charging the battery. The charger is disposed in a vehicle cabin.

SUMMARY

When a charger is disposed in a front compartment of a vehicle body, a brake unit also disposed in the front compartment may be located adjacent to the charger. In this case, the brake unit may strongly contact the charger in the event of a vehicle collision. It is not preferable that the brake unit strongly contacts the charger electrically connected to a battery. It is necessary to avoid the brake unit from strongly contacting any other electrical units electrically connected to the battery, in addition to with the charger.

The present specification provides a technique for avoiding a brake unit from strongly contacting an electrical unit disposed in a front compartment.

The technique disclosed in the present specification is embodied as a vehicle. In a first aspect of the present technique, the vehicle includes: a vehicle body including a front compartment; a battery; an electrical unit disposed in the front compartment and electrically connected to the battery; and a brake unit disposed in the front compartment and located rearward of the electrical unit in a vehicle front-rear direction. The brake unit is disposed adjacent to the electrical unit at a position offset to one side in a vehicle left-right direction with respect to the electrical unit. One of the electrical unit and the brake unit is provided with a protector that covers a region located adjacent to another. A portion of the protector that extends in the vehicle front-rear direction includes a tilted surface that gradually changes in position to the one side in the vehicle left-right direction toward a front of the vehicle.

In the above vehicle, the brake unit may come into contact with the electrical unit in the event of, for example, a collision of the vehicle. However, the one of the electrical unit and the brake unit is provided with the protector over the region located adjacent to the other, so that direct contact between the electrical unit and the brake unit is avoided. Over a side surface of the electrical unit, the portion of the protector that extends in the vehicle front-rear direction includes the tilted surface that gradually changes in position to the one side in the vehicle left-right direction toward the front of the vehicle. Accordingly, when the electrical unit and the brake unit approach each other in the vehicle front-rear direction, the tilted surface of the protector guides these two units so as to separate them from each other in the vehicle left-right direction. As a result, the brake unit is avoided from strongly contacting the electrical unit.

In a second aspect of the present technique, in addition to the first aspect, the electrical unit may include an alternating current (AC) charger configured to charge the battery using an external AC power supply, and a casing that houses the AC charger. The protector may be fixed to an outer surface of the casing. With such a configuration, the brake unit can be avoided from strongly contacting the casing that houses the AC charger, in the case where the AC charger is disposed in the front compartment.

In a third aspect of the present technique, in addition to the second aspect, the casing may include a rear surface located on a rear side in the vehicle front-rear direction and a side surface located on the one side in the vehicle left-right direction. The protector may be provided on the rear surface and the side surface of the casing. With such a configuration, the protector can effectively cover the region of the casing of the electrical unit that is highly likely to be contacted by the brake unit.

In a fourth aspect of the present technique, in addition to the third aspect, the protector may include an upper edge portion, a lower edge portion, and an intermediate portion located between the upper edge portion and the lower edge portion. The upper edge portion and the lower edge portion may be in contact with and fixed to the casing. At least part of the intermediate portion may be separated from the casing to form the tilted surface. With such a configuration, the protector is in the form of a rib with the intermediate portion raised with respect to the upper edge portion and the lower edge portion, and thus exhibits high rigidity.

In a fifth aspect of the present technique, in addition to the fourth aspect, the intermediate portion of the protector may protrude beyond the upper edge portion and the lower edge portion to form the tilted surface. With such a configuration, the tilted surface of the protector can be made relatively wide with respect to the overall size of the protector. The brake unit is thus effectively avoided from strongly contacting the electrical unit.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 4 is a perspective view of a charging unit;

FIG. 5 is a plan view of a protector attached to a charging unit; and

DETAILED DESCRIPTION OF EMBODIMENTS

Figure 1:
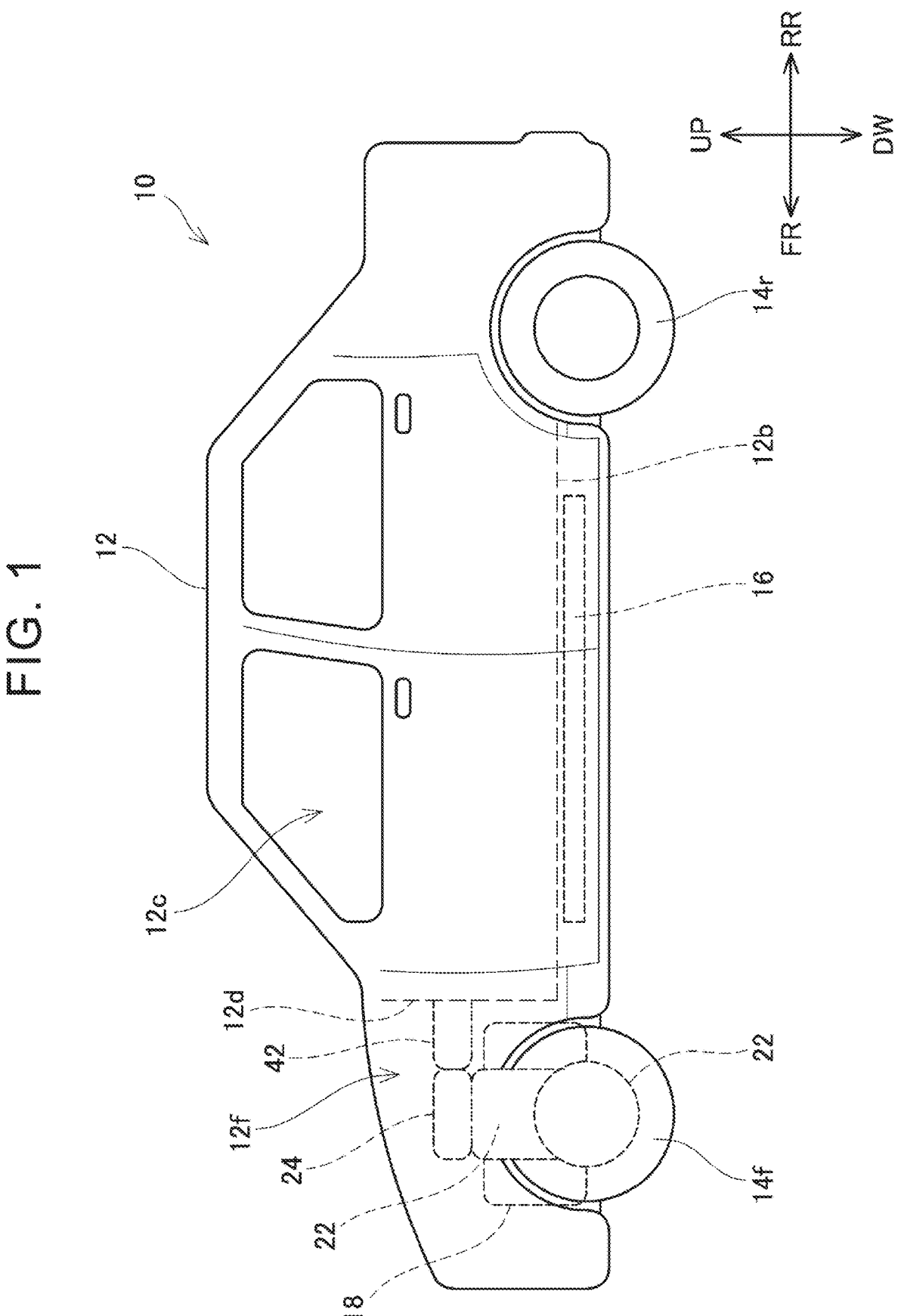
FIG. 1 is a side view schematically illustrating a configuration of a vehicle.

The vehicle 10 will be described with reference to the drawings. The vehicle 10 is a plug-in hybrid electric vehicle (PHEV: Plug-in Hybrid Electric Vehicle). However, the vehicle 10 is not limited to plug-in hybrid electric vehicle, and may be other types of electrified vehicle such as battery electric vehicle (BEV: Battery Electric Vehicle) or hybrid electric vehicle (HEV: Hybrid Electric Vehicle).

Here, the direction FR in the drawing indicates the front in the vehicle front-rear direction, and the direction RR indicates the rear in the vehicle front-rear direction. The direction LH indicates the left in the vehicle left-right direction (or the widthwise direction), and the direction RH indicates the right in the vehicle left-right direction. The direction UP indicates an upward direction in the vehicle up-down direction, and the direction DW indicates a downward direction in the vehicle up-down direction. In this specification, the front side of the vehicle front-rear direction, the rear side of the vehicle front-rear direction, the left side of the vehicle left-right direction, the right side of the vehicle left-right direction, the upper side of the vehicle up-down direction, the lower side of the vehicle up-down direction, simply forward side, rear side, left side, right side, may be referred to as upper side, lower side, respectively. Similarly, the vehicle front-rear direction, the vehicle left-right direction, and the vehicle up-down direction may be simply referred to as the front-rear direction, the left-right direction, and the up-down direction, respectively.

Figure 2:
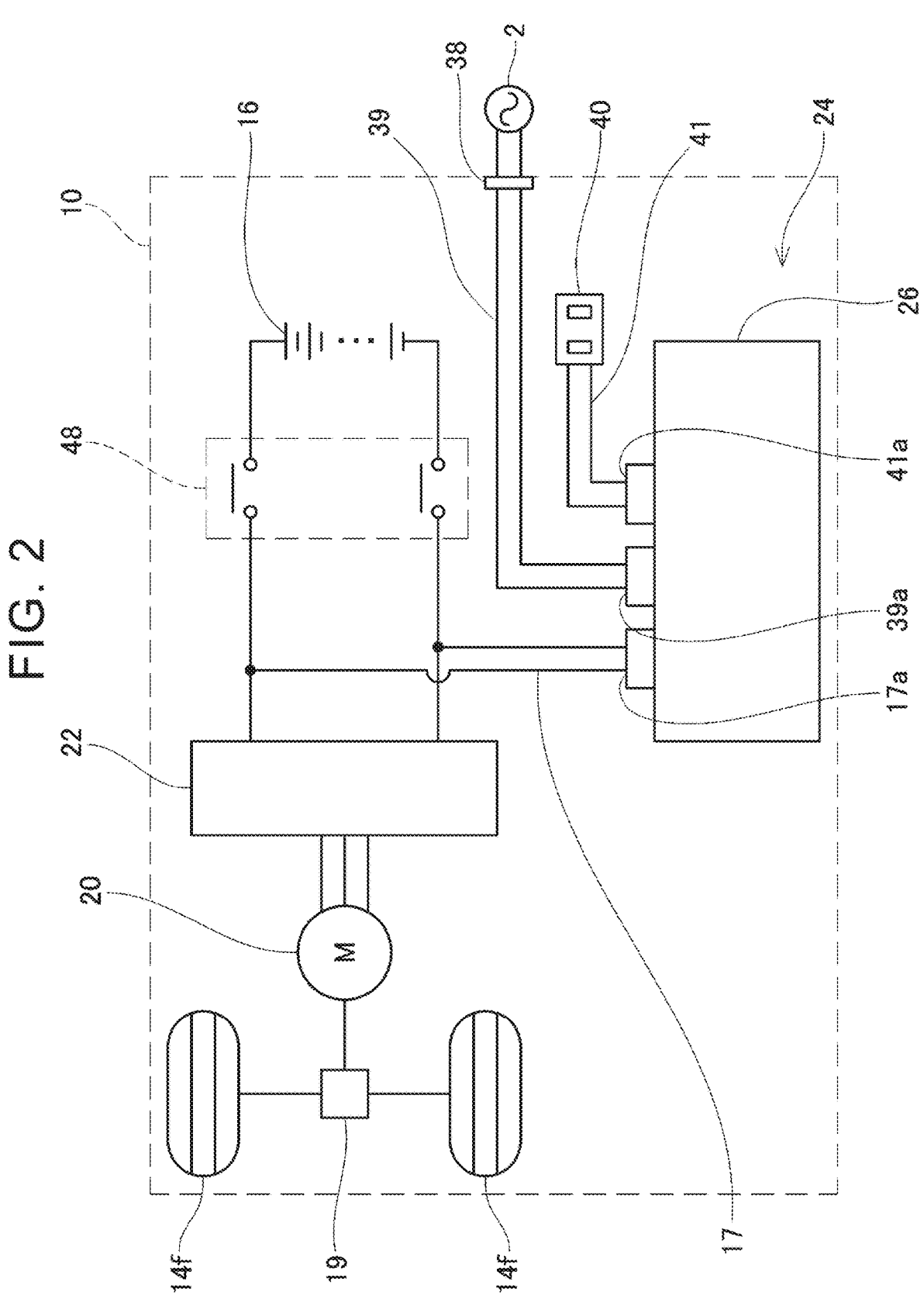
FIG. 2 is a block diagram schematically illustrating a configuration of a vehicle.

As illustrated in FIGS. 1 and 2, the vehicle 10 includes a vehicle body 12 and a plurality of wheels 14f, 14r. The vehicle body 12 is made of a metal such as a steel-based material or an aluminum-based material. The plurality of wheels 14f, 14r supports the vehicle body 12. The plurality of wheels 14f, 14r includes a pair of front wheels 14f located at a front portion of the vehicle body 12 and a pair of rear wheels 14r located at a rear portion of the vehicle body 12. The pair of front wheels 14f is respectively located on the left and right sides of the vehicle body 12. The pair of rear wheels 14r is respectively located on the left and right sides of the vehicle body 12.

A cabin 12c and a front-compartment 12f located in front of the cabin 12c are defined inside the vehicle body 12. The cabin 12c is configured to allow a user to board. The vehicle body 12 includes a floor panel 12b and a dash panel 12d. The floor panel 12b defines a floor of the cabin 12c. The dash-panel 12d is interposed between the cabin 12c and the front-compartment 12f.

The vehicle 10 includes a battery 16, an engine 18, a traveling motor 20, a power control unit (PCU) 22, charging unit 24, brake unit 42, charging inlet 38, and power supply outlet 40.

The battery 16 is disposed below the floor-panel 12b. The battery 16 includes one or a plurality of secondary battery cells and is configured to be chargeable and dischargeable. The secondary battery cell is not particularly limited, but may be, for example, a lithium-ion battery cell or an all-solid-state battery cell.

The engine 18 is arranged in the front-compartment 12f. The engine 18 is a heat engine that burns fuel to generate power, and is not particularly limited, and examples thereof include a gasoline engine, a diesel engine, and a hydrogen engine. The engine 18 is connected to a pair of front wheels 14f via a speed reducer 19 and a power split mechanism (not shown). Engine 18 drives a pair of front wheels 14f.

The traveling motor 20 is arranged in the front-compartment 12f. The traveling motor 20 is connected to the battery 16 via a PCU 22. The traveling motor 20 is connected to a pair of front wheels 14f via the speed reducer 19. The traveling motor 20 drives a pair of front wheels 14f using electric power supplied from the battery 16. However, the traveling motor 20 is not limited to the pair of front wheels 14f, and may drive at least one of the plurality of wheels 14f, 14r.

PCU 22 is arranged in the front-compartment 12f. PCU 22 is connected to the battery 16 via a system main relay 48.

PCU 22 is disposed between the battery 16 and the traveling motor 20. PCU 22 includes inverters, converters, and the like. PCU 22 controls the electric power supplied from the battery 16 and supplies the driving electric power to the traveling motor 20.

The charging inlet 38 is configured such that an external AC power supply 2 can be attached and detached. The external AC power supply 2 is, for example, a commercial power supply for home use. The charging inlet 38 receives charging power for charging the battery 16 from the external AC power supply 2. The charging inlet 38 of the present embodiment is connected to an external AC power supply 2 via a cable. However, as another embodiment, the charging inlet 38 may be wirelessly connected to the external 20 AC power supply 2.

The power supply outlet 40 is located in the cabin 12c. The power supply outlet 40 is configured to be detachable from an electric device. The power supply outlet 40 outputs AC power to the electric apparatus. Examples of the electric device include a home electric appliance, a personal computer, a smartphone, and a tablet terminal.

The charging unit 24 is arranged in the front-compartment 12f. The charging unit 24 is electrically connected to the battery 16 via the first cable 17 and the system main relay 48. The first cable 17 has a first connector 17a. The first connector 17a is configured to be attachable to and detachable from the charging unit 24. The charging unit 24 is electrically connected to the charging inlet 38 via the second cable 39. The second cable 39 has a second connector 39a. The second connector 39a is configured to be attachable to and detachable from the charging unit 24. The charging unit 24 is connected to the power supply outlet 40 via a third cable 41. The third cable 41 has a third connector 41a. The third connector 41a is configured to be attachable to and detachable from the charging unit 24.

Figure 3:
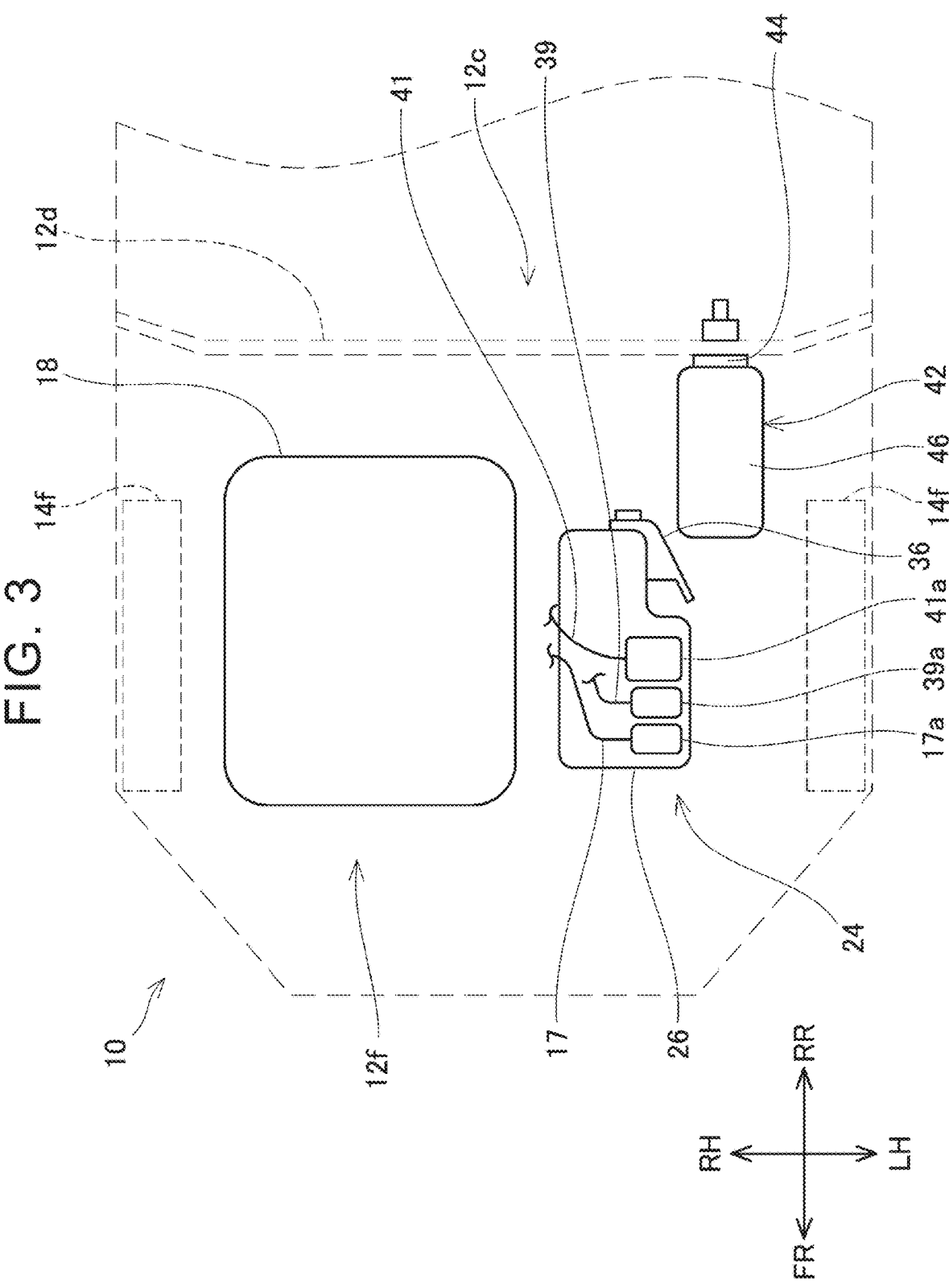
FIG. 3 is a plan view schematically showing a configuration of a main part of a vehicle.

As illustrated in FIGS. 2 and 3, the charging unit 24 includes a bidirectional charger 28, a casing 26, and a protector 36. The bidirectional charger 28 is a type of power converter. The bidirectional charger 28 is configured to convert AC power supplied from the external AC power supply 2 into DC power for charging the battery 16. In addition, the bidirectional charger 28 is configured to convert DC power supplied from the battery 16 into AC power supplied to the power supply outlet 40. The bidirectional charger 28 is housed in a casing 26. The protector 36 is attached to the casing 26. The casing 26 is made of metal. The metal constituting the casing 26 may be, for example, an aluminum-based metal or a steel-based metal.

The brake unit 42 is arranged in the front-compartment 12f. The brake unit 42 is disposed adjacent to the rear side of the charging unit 24. The brake unit 42 is arranged to be offset leftward with respect to the charging unit 24. The brake unit 42 includes a hydraulic device 44 including a brake master cylinder and the like. The hydraulic device 44 is mechanically connected to a brake pedal (not shown), and generates a high pressure in the hydraulic oil in the hydraulic device 44 in response to an operation applied to the brake pedal. Hydraulic equipment 44 has a housing 46. The housing 46 holds the hydraulic oil in a liquid-tight manner. The housing 46 has a relatively high rigidity due to the high pressure of the hydraulic oil acting on the housing 46. The housing 46 is made of metal. The metal constituting the housing 46 may be, for example, an aluminum-based metal or a steel-based metal.

Figure 4:
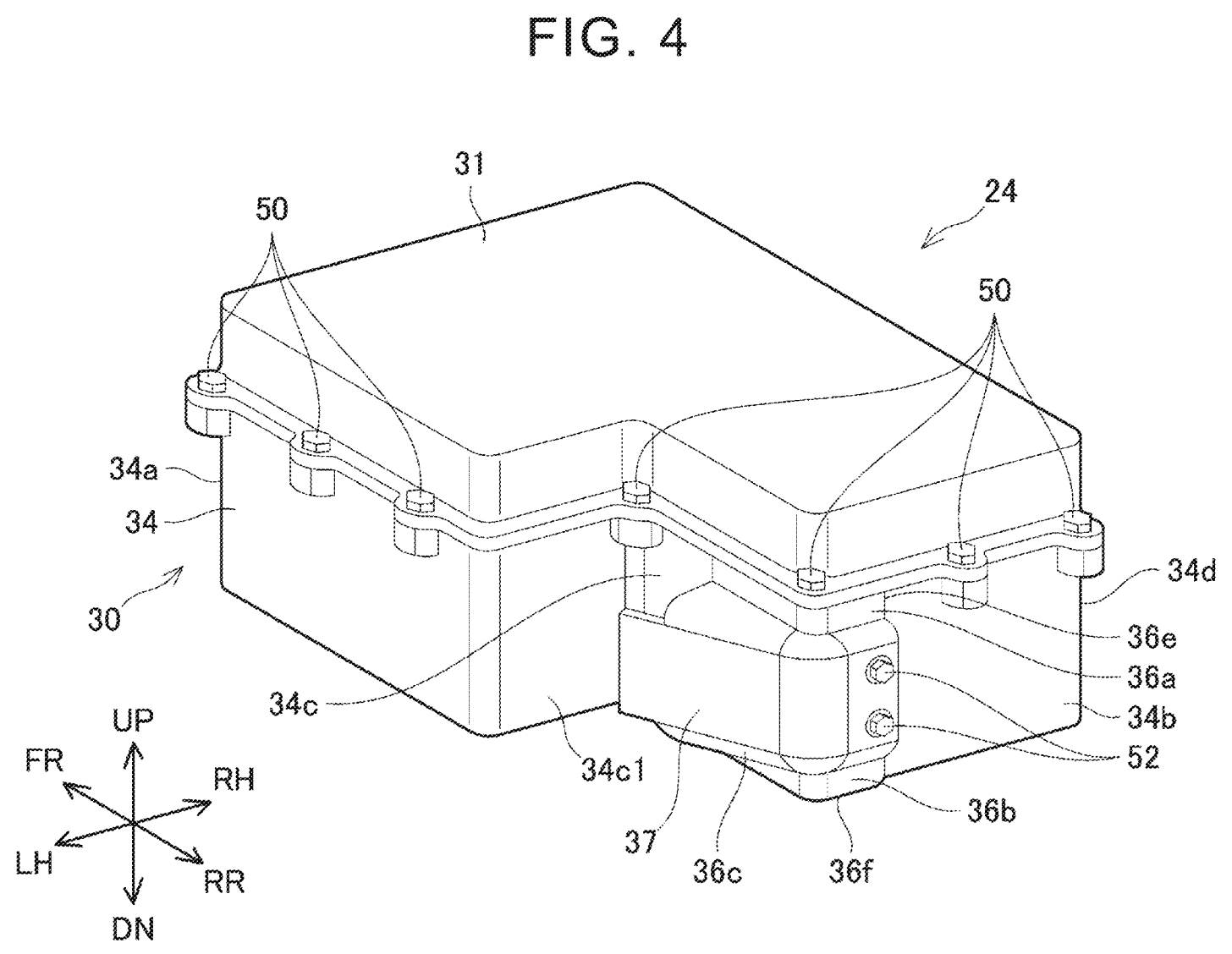
Figure 5:
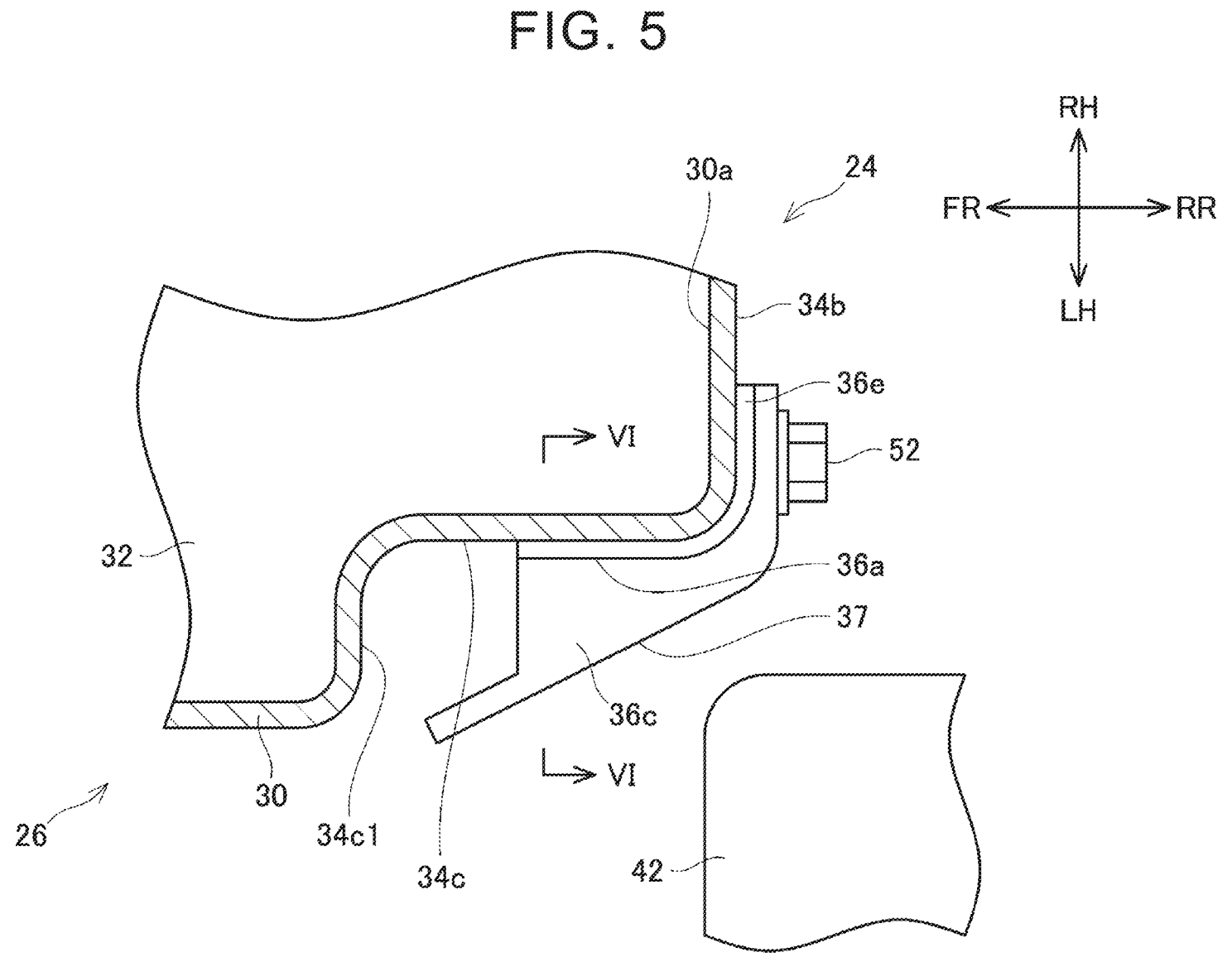
Figure 6:
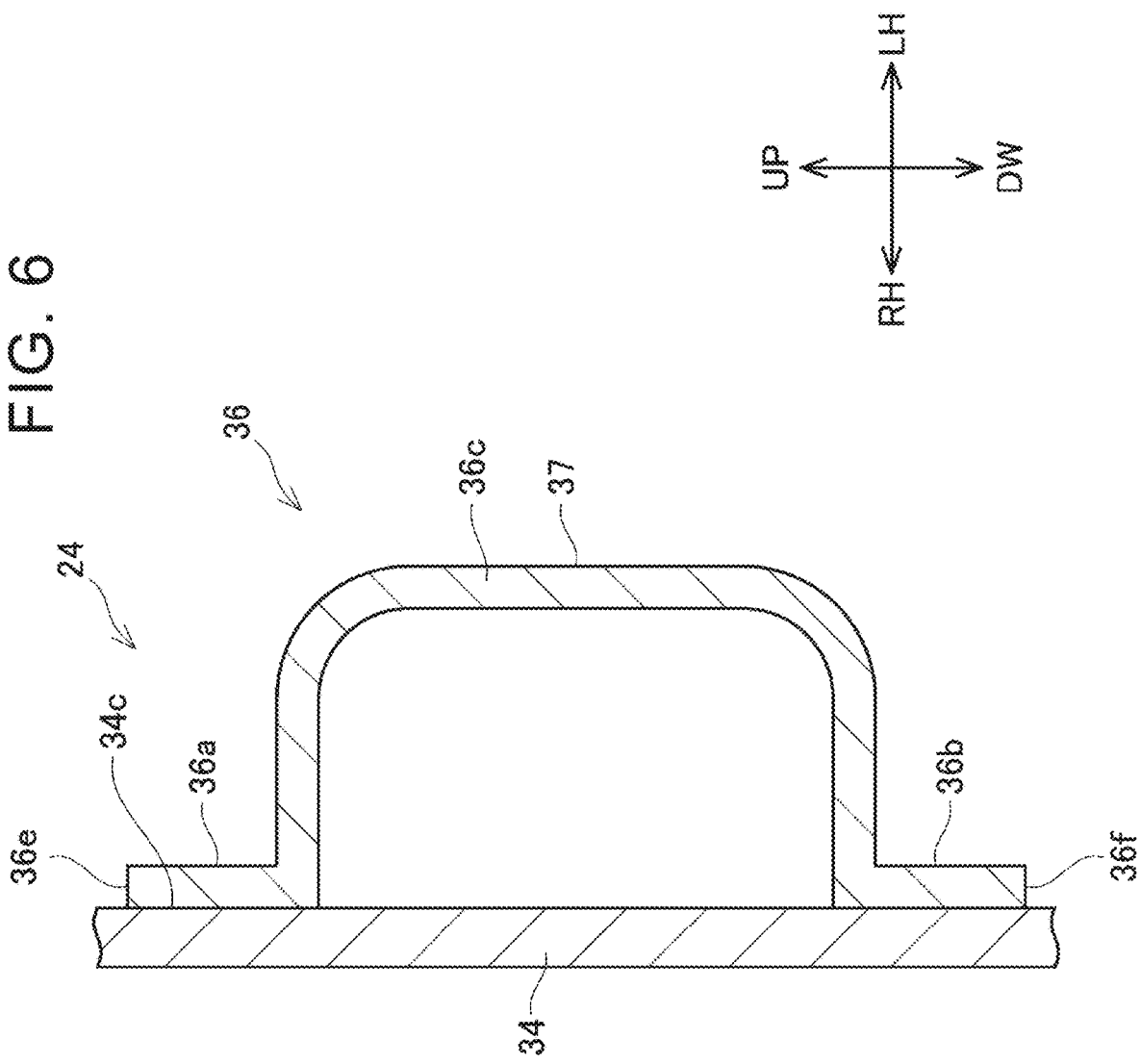
FIG. 6 is an end view of VI-VI of FIG. 5, showing the configuration of the protector.

A detailed configuration of the charging unit 24 will be described with reference to FIGS. 4 to 6. As shown in FIGS. 4 and 5, the casing 26 of the charging unit 24 is a housing member. The casing 26 includes a casing main body 30 and a cover 31. The casing main body 30 has an opening 30a that opens upward. The casing main body 30 has a bottom wall 32 and a peripheral wall 34 extending upward from a peripheral edge of the bottom wall 32. The upper end of the peripheral wall 34 forms an opening 30a. The cover 31 is a member that covers the opening 30a of the casing main body 30. The cover 31 is fixed to the peripheral wall 34 using a plurality of bolts 50. The outer surface of the peripheral wall 34 has a front surface 34a located on the front side, a rear surface 34b located on the rear side, a left side surface 34c located on the left side, and a right side surface 34d located on the right side. Each of the left side surface 34c and the right side surface 34d extends from the front surface 34a to the rear surface 34b. On the left side surface 34c, a recessed 34c1 is formed in a region close to the brake unit 42.

The charging unit 24 includes a protector 36. The protector 36 is a bent plate-shaped member. The protector 36 is made of metal. The protector 36 is attached to the peripheral wall 34. The protector 36 is fixed to the rear surface 34b of the peripheral wall 34 by using a plurality of (two in the present embodiment) bolts 52. The protector 36 is provided from the rear surface 34b to the left side surface 34c of the peripheral wall 34. The protector 36 has an upper edge portion 36a, a lower edge portion 36b, and an intermediate portion 36c. The upper edge portion 36a includes an upper edge 36e of the protector 36. The lower edge portion 36b includes a lower edge 36f of the protector 36. The intermediate portion 36c is located between the upper edge portion 36a and the lower edge portion 36b. The upper edge portion 36a and the lower edge portion 36b are fixed to the outer surface (that is, the rear surface 34b and the left side surface 34c) of the peripheral wall 34. A dimension of the protector 36 in the up-down direction is substantially equal to a dimension (i.e., a height) of the peripheral wall 34 in the up-down direction. The upper edge 36e of the upper edge portion 36a is located at the upper end portion of the peripheral wall 34, and the lower edge 36f of the lower edge portion 36b is located at the lower end portion of the peripheral wall 34.

The intermediate portion 36c of the protector 36 has a tilted surface 37. The tilted surface 37 is provided in a portion extending in the front-rear direction of the intermediate portion 36c. The tilted surface 37 gradually changes in position to the left toward the front. That is, as shown in FIG. 6, part of the intermediate portion 36c is separated from the peripheral wall 34 to form the tilted surface 37. According to such a configuration, the protector 36 is in the form of a rib with the intermediate portion 36c raised with respect to the upper edge portion 36a and the lower edge portion 36b, and thus exhibits higher rigidity. In a modification, the intermediate portion 36c may be entirely spaced from the peripheral wall 34.

The intermediate portion 36c of the protector 36 protrudes beyond the upper edge portion 36a and the lower edge portion 36b to form the tilted surface 37. The intermediate portion 36c projects forward beyond the upper edge portion 36a and the lower edge portion 36b. In a variant, the intermediate portion 36c may project rearward beyond the upper edge portion 36a and the lower edge portion 36b.

In the vehicle 10 of the present embodiment, the brake unit 42 may come into contact with the charging unit 24 in the event of, for example, a collision of the vehicle 10. However, the charging unit 24 is provided with a protector 36 in a region adjacent to the brake unit 42, and direct contact between the two units 24, 42 is avoided. On a left side surface 34c of the charging unit 24, a portion of the protector 36 that extends in the front-rear direction includes a tilted surface 37 that gradually changes in position to the left toward the front. Accordingly, when the charging unit 24 and the brake unit 42 approach each other in the front-rear direction, the tilted surface 37 provided on the protector 36 guides the two units 24, 42 so as to be separated from each other in the left-right direction. As a result, the brake unit 42 is avoided from strongly contacting the charging unit 24.

In the vehicle 10 of the present embodiment, the protector 36 is fixed to the outer surface of the casing 26 of the charging unit 24. According to such a configuration, when the bidirectional charger 28 is disposed in the front-compartment 12f, the brake unit 42 can be prevented from strongly contacting the casing 26 that houses the bidirectional charger 28. The bidirectional charger 28 is an example of an "AC charger" according to the present technology.

In the casing 26 of the charging unit 24 in the present embodiment, the protector 36 is provided from the rear surface 34b of the casing 26 to the left side surface 34c. According to such a configuration, the protector 36 can effectively cover the region of the casing 26 of the charging unit 24 that is highly likely to be contacted by the brake unit 42.

In the protector 36 of the present embodiment, the intermediate portion 36c may protrude from the upper edge portion 36a and the lower edge portion 36b to form the tilted surface 37. According to such a configuration, the tilted surface 37 of the protector 36 can be made relatively wide with respect to the entire size of the protector 36. The brake unit 42 is thus effectively avoided from strongly contacting the charging unit 24.

Here, the charging unit 24 is an example of an "electrical unit" according to the present technology. The electrical unit is not limited to the charging unit 24, and may be another electrical unit electrically connected to the battery 16. The left side in the vehicle left-right direction is an example of "one side in the vehicle left-right direction" according to the present technology.

The protector 36 may be provided in the brake unit 42 instead of the charging unit 24. Even in such a configuration, when the charging unit 24 and the brake unit 42 approach each other in the front-rear direction, the tilted surface provided on the protector can guide the two units 24, 42 so as to be separated from each other in the left-right direction. As a result, the brake unit 42 is avoided from strongly contacting the charging unit 24. However, in terms of protecting the charging unit 24 electrically connected to the battery 16, the protector 36 is preferably provided in the charging unit 24.

What is claimed is:

1. A vehicle comprising:
   a vehicle body including a front compartment;
   a battery;
   an electrical unit disposed in the front compartment and electrically connected to the battery; and
   a brake unit disposed in the front compartment and located rearward of the electrical unit in a vehicle front-rear direction, wherein
   the brake unit is disposed adjacent to the electrical unit at a position offset to one side in a vehicle left-right direction with respect to the electrical unit,
   one of the electrical unit and the brake unit is provided with a protector that covers a region located adjacent to another, and
   a portion of the protector that extends in the vehicle front-rear direction includes a tilted surface that gradually changes in position to the one side in the vehicle left-right direction toward a front of the vehicle.

2. The vehicle according to claim 1, wherein:

the electrical unit includes an alternating current charger configured to charge the battery using an external alternating current power supply, and a casing that houses the alternating current charger; and the protector is fixed to an outer surface of the casing.

3. The vehicle according to claim 2, wherein:

the casing includes a rear surface located on a rear side in the vehicle front-rear direction and a side surface located on the one side in the vehicle left-right direction; and the protector is provided on the rear surface and the side surface of the casing.

4. The vehicle according to claim 3, wherein:

the protector includes an upper edge portion, a lower edge portion, and an intermediate portion located between the upper edge portion and the lower edge portion;

the upper edge portion and the lower edge portion are in contact with and fixed to the casing; and at least part of the intermediate portion is separated from the casing to form the tilted surface.

5. The vehicle according to claim 4, wherein the intermediate portion of the protector protrudes beyond the upper edge portion and the lower edge portion to form the tilted surface.

* * * * *